United States Patent [19]

Ichikawa

[11] Patent Number: 5,433,841
[45] Date of Patent: Jul. 18, 1995

[54] METHOD FOR REFORMING HYDROCARBONS

[75] Inventor: Yoshio Ichikawa, Yokohama, Japan

[73] Assignee: Kabushiki Kaisha Nippankenkyusho, Kanagawa, Japan

[21] Appl. No.: 223,114

[22] Filed: Apr. 5, 1994

[30] Foreign Application Priority Data

Apr. 12, 1993 [JP] Japan .................. 5-107165

[51] Int. Cl.6 ............................................... C10G 35/06
[52] U.S. Cl. ........................................ 208/134; 208/135
[58] Field of Search ................................ 208/134, 135

[56] References Cited

U.S. PATENT DOCUMENTS

| | | | |
|---|---|---|---|
| 3,770,616 | 11/1973 | Kominami et al. | 208/138 |
| 4,746,418 | 5/1988 | Baird, Jr. | 208/139 |
| 4,810,685 | 3/1989 | Twigg et al. | 502/60 |
| 4,812,435 | 3/1989 | Baird, Jr. | 502/227 |
| 4,983,558 | 1/1991 | Born et al. | 502/31 |
| 5,112,706 | 5/1992 | Pinsky et al. | 502/352 |
| 5,182,165 | 1/1993 | Clough et al. | 428/263 |
| 5,266,204 | 11/1993 | Clough et al. | 502/4 |
| 5,326,633 | 7/1994 | Clough et al. | 428/288 |

*Primary Examiner*—Helane Myers
*Attorney, Agent, or Firm*—Birch, Stewart, Kolasch & Birch

[57] ABSTRACT

Hydrocarbons are allowed to come into contact with reforming catalysts in which surfaces of inorganic substrates and/or metallic substrates are treated with silver-containing coating agents, whereby formation of polymers of hydrocarbons such as edible oils and engine oil can be inhibited under conditions under which thermal polymerization rapidly proceeds, resulting in prevention of an increase in kinematic viscosity of the hydrocarbons to substantially prevent fats and oils and petroleum products from deteriorating, and further coagulated molecules of gasoline, kerosine, oil fuel, jet fuel and crude oil can be subdivided, resulting in improved atomization and combustion efficiency.

6 Claims, 2 Drawing Sheets

METHOD FOR REFORMING HYDROCARBONS

BACKGROUND OF THE INVENTION

1. Field of the Invention

The present invention relates to a method for reforming hydrocarbons. More particularly the present invention relates to a method for reforming hydrocarbons wherein a solid reforming catalyst is used which can eliminate radicals formed in the course of oxidation polymerization or thermal polymerization of hydrocarbons, such as fats and oils and petroleum products, to prevent molecules from becoming giant (being polymerized), and which can subdivide molecules of hydrocarbons, such as petroleum products such as gasoline and gas oil. More specifically, the present invention relates to a method for reforming hydrocarbons, by which deterioration of edible oils due to frying can be prevented, thereby substantially prolonging the life of the edible oils, and molecules of gasoline or gas oil can be subdivided to conduct fine atomization, thereby promoting complete combustion.

2. Description of the Related Art

Previously, natural antioxidants such as tocopherol, ascorbic acid and citric acid, or various synthetic antioxidants have been used as antioxidants preventing hydrocarbons from reacting with oxygen, to retard oxidation for fats and oils. For petroleum, 2,6-di-t-butyl-4-methylphenol, 2,4-dimethyl-6-t-butylphenol and N,N'-diisopropyl-p-phenylenediamine have been used. However, these antioxidants are consumption type additives, and used for the purpose of preventing autoxidation at ordinary temperature. They have therefore no substantial effect of preventing thermal polymerization of fats and oils or lubricating oils at elevated temperatures.

For example, in the case of an edible oil, heating causes sudden thermal oxidation at the contact surface with air to form peroxides, and polymers are formed via dimers, resulting in increased viscosity. In frying, when a material is placed in the oil having increased viscosity, fine bubbles are generated and do not easily break, and harmful cyclic compounds are also produced. An increase in viscosity inhibits heat conduction to the material which is an essential object of the oil, and causes fried food to be impregnated with the oil, resulting in oiliness and in deteriorated flavor. The food is not crisply fried and the freshness is not maintained. However, no method for solving these problems has been developed.

In conventional gasoline or gas oil, radicals (ROO.) generated in the course of an oxidation reaction during storage or on combustion are polymerized to form giant molecules, thereby forming polymers, which lowers combustion efficiency. Further, the molecules aggregate and are not subdivided, so that fine atomization is not completely conducted. As a result, in idling of automobiles, in running at constant speed, in running at decelerated speed or in running at high speed, the amount of hydrocarbons discharged is increased. This is unfavorable in respect to environmental sanitation and is uneconomical.

SUMMARY OF THE INVENTION

An object of the present invention is to provide a method for reforming hydrocarbons by which radicals formed in the course of oxidation polymerization or thermal polymerization of hydrocarbons, such as fats and oils and petroleum products, can be eliminated to prevent molecules from becoming giant (being polymerized), and further by which molecules of petroleum products such as gasoline and gas oil can be subdivided. More specifically, an object of the present invention is to provide a method for reforming hydrocarbons by which deterioration of edible oils due to frying can be prevented to substantially prolong the life of the edible oils, and molecules of gasoline or gas oil can be subdivided to conduct fine atomization, thereby promoting complete combustion.

The present invention provides a method for reforming a hydrocarbon which comprises allowing the hydrocarbon to come into contact with a reforming catalyst in which a surface of an inorganic substrate and/or a metallic substrate is treated with a silver-containing coating agent.

DESCRIPTION OF THE PREFERRED EMBODIMENTS

The substrates constituting the reforming catalysts used in the present invention serve as bases which are coated with the coating agents, followed by heat curing, thus producing the reforming catalysts for hydrocarbons.

In order to exhibit the effect of preventing polymerization of the reforming catalysts at its maximum, the substrates are preferably formed of inexpensive materials having a large surface area and durability.

Of such substrates, examples of inorganic substrates include porous shaped products obtained by baking at least one compound selected from the group consisting of fine granular aluminosilicate minerals and/or silicate minerals, fine granular metal oxides, fine granular metal hydroxides and fibrous metal oxides.

Examples of the aluminosilicate minerals and the silicate minerals include zeolite, kaolinite, sepiolite, feldspar, vermiculite, high alumina clay and sillimanite. The metal oxides include silica gel, alumina, zircon, magnesite, iron oxide and manganese oxide. The metal hydroxides include aluminum hydroxide and iron hydroxide. The fibrous metal hydroxides include silica fiber, alumina fiber and silica-alumina fiber. They are baked at about 800° to about 1,800° C. and formed to a granular or tabular form. The porous shaped products thus obtained are used as the substrates. It is preferred that the metallic substrates have no eluting property. As such metallic substrates, foamed metals and/or metals at least surfaces of which are treated to a porous form or roughened are preferably employed. Aluminum, iron, stainless steel copper and other alloys are treated as described above. Examples of the foamed metals include foamed aluminum.

In order to obtain the porous surface, for example, aluminum, iron or stainless steel is treated to a porous form during its production stage, or a fibrous metal is adhered to the surface by melting.

Further, the roughened surface can be obtained by blast treatment or acid-alkali etching treatment.

The shape of such substrates may be any, granular or tabular. In the case of the granular substrates, the average particle size is 1 to 50 mm, and preferably 3 to 30 mm. A particle size of less than 1 mm results in easy destruction and difficult putting in a container. On the other hand, a particle size of more than 50 mm unfavorably results in a relatively small specific surface area.

In the case of the tabular substances, the length of one side is preferably 2 to 300 mm. A length of less than 2 mm results in easy destruction, whereas a length of more than 300 mm unfavorably results in difficult handling and easy cracking.

The reforming catalysts used in the present invention can by obtained by coating such substrates with the coating agents, followed by heat curing.

In the present invention, the coating agents contain silver. It is preferred that such a coating agent is mainly composed of a composition obtained by mixing (a) to (d) described below:

(a) (i) an organoalkoxysilane represented by general formula $R^1Si(OR^2)_3$ (wherein $R^1$ represents an organic group having 1 to 8 carbon atoms, and $R^2$ represents an alkyl group having 1 to 5 carbon atoms or an acyl group having 1 to 4 carbon atoms) (hereinafter also referred to as (i)); and (ii) at least one compound selected from the group consisting of a tetraalkoxysilane represented by general formula $Si(OR^2)_4$ (wherein $R^2$ has the same meaning as given above) and a zirconium compound represented by general formula $Zr(OR')_4$ (wherein $R'$, which may be the same or different, represents a hydrocarbon residue having 2 to 5 carbon atoms) (hereinafter also referred to as (ii));

(b) at least one inorganic compound selected from the group consisting of zeolite, silica gel, aluminosilicate minerals and alumino-silica gel to which a silver salt or colloidal silver is added in an amount of 0.2 to 10% by weight in terms of silver by ion exchange, adsorption or adherence;

(c) an alcohol; and (d) water.

In this composition, a fine granular inorganic compound having an extensive specific surface area to which silver is given in the ion state by adsorption or ion exchange is fixedly bonded to the surface of the substrate by an ultrafine granular gel layer formed by hydrolysis of the organoalkoxysilane, the tetraalkoxysilane or the zirconium compound excellent in adhesion, resistance to oil, durability and hardness.

The coating compositions are described by ingredients in detail below:

(a) (i) The organoalkoxysilanes represented by general formula $R^1Si(OR^2)_3$;

The organoalkoxysilanes used in the present invention are hydrolyzed or polycondensed in the presence of water to form polymers, and when coating films are formed, curing takes place by heating or standing at ordinary temperature. Thus, the organoalkoxysilanes serve as binders in the coating agents used in the present invention.

$R^1$ in such organoalkoxysilanes is an organic group having 1 to 8 carbon atoms. Examples thereof include a γ-chloropropyl group, a vinyl group, a 3,3,3-trifluoropropyl group, a γ-glycidoxypropyl group, a γ-methacryloxypropyl, a γ-mercaptopropyl group, a phenyl group, a 3,4-epoxycyclohexylethyl group and γ-aminopropyl group, as well as alkyl groups such as methyl, ethyl, n-propyl and i-propyl;

$R^2$ in the organoalkoxysilanes is an alkyl group having 1 to 5 carbon atoms or an acyl group having 1 to 4 acyl group, such as methyl, ethyl, n-propyl, i-propyl, n-butyl, sec-butyl, t-butyl or acetyl.

Examples of these organoalkoxysilanes include methyltrimethoxysilane, methyltriethoxysilane, ethyltrimethoxysilane ethyltriethoxysilane, n-propyltrimethoxysilane, n-propyltriethoxysilane, i-propyltrimethoxysilane, i-propyltriethoxysilane, γ-chloropropyltrimethoxysilane, γ-chloropropyltriethoxysilane, vinyltrimethoxysilane, vinyltriethoxysilane, 3,3,3-trifluoropropyltrimethoxysilane, 3,3,3-trifluoropropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, γ-mercaptopropyltrimethoxysilane, γ-mercaptopropyltriethoxysilane, phenyltrimethoxysilane, phenyltriethoxysilane, γ-aminopropyltrimethoxysilane, 3,4-epoxycyclohexylethyltrimethoxysilane and 3,4-epoxycyclohexylethyltriethoxysilane.

Of these organoalkoxysilanes, methyltrimethoxysilane is particularly preferred. These organoalkoxysilanes may be used alone or as a combination of two or more of them.

Such organoalkoxysilanes liberate alcohol by hydrolysis in acidic aqueous media to produce corresponding silanols (hydrolyzates), and simultaneously, polycondensation occurs to form partial condensates and further complete condensates or organopolysiloxane compounds.

In the present invention, therefore, (i) includes the hydrolyzates, the partial condensates and further the complete condensates, as well as the organoalkoxysilanes.

(ii) The tetraalkoxysilanes represented by general formula $Si(OR^2)_4$ (wherein $R^2$ has the same meaning as given above) and the zirconium compounds represented by general formula $Zr(OR')_4$ (wherein $R'$, which may be the same or different, represents a hydrocarbon residue having 2 to 5 carbon atoms);

Examples of the tetraalkoxysilanes represented by general formula $Si(OR^2)_4$ (wherein $R^2$ has the same meaning as given above) include tetramethoxysilane, tetraethoxysilane, tetra-n-propoxysilane, tetra-i-propoxysilane, tetra-n-butoxy-silane, tetra-sec-butoxysilane and tetra-tert-butoxysilane. These tetraalkoxysilanes may also be used alone or as a combination of two or more of them.

Such tetraalkoxysilanes liberate alcohol by hydrolysis in acidic aqueous media to produce hydrolyzates, and simultaneously, polycondensation occurs to form partial condensates and further a complete condensate or silicon dioxide.

In the present invention, therefore, the tetraalkoxysilanes, one ingredient of (ii), also include the hydrolyzates, the partial condensates and further the complete condensate.

The zirconium compounds represented by general formula $Zr(OR')_4$ used in the present invention are hydrolyzed in the presence of a slight amount of water (moisture in the air or in the substrates), and the resulting hydrolyzates are polycondensed to produce partial condensates. When the partial condensates are further polycondensed to polymers to form coating films, the coating films are cured by heating. In the coating compositions used in the present invention, the zirconium compounds serve as binders, used in combination with the tetraalkoxysilanes together with the organoalkoxysilanes constituting (i).

R' of such zirconium compounds, which may be the same or different, is a hydrocarbon residue having 2 to 5 carbon atoms, such as ethyl, n-propyl, i-propyl, n-butyl, sec-butyl or tert-butyl.

Examples of the zirconium compounds include zirconium tetraethoxide, zirconium tetra-n-propoxide, zirconium tetra-i-propoxide, zirconium tetra-n-butoxide, zirconium tetra-sec-butoxide and zirconium tetra-tert-butoxide. These zirconium compounds may be used alone or as a combination of two or more of them.

Of these compounds, zirconium tetra-n-butoxide is preferred.

Such zirconium compounds liberate alcohol by rapid hydrolysis to produce corresponding zirconium hydroxides, and simultaneously, hydroxyl substituents are polycondensed by formation of said hydroxides to form partial condensates thereof. The partial condensates are further polycondensed to form complete condensates or zirconia components.

In the present invention, therefore, the zirconium compounds also include the hydrolyzates, the partial condensates thereof and further the complete condensates thereof, as well as the zirconium compounds represented by the above-mentioned general formula. Such hydrolyzates or partial condensates may be formed from the above-mentioned zirconium compounds in the coating compositions, or may previously be added to the coating compositions when they are prepared.

Although such zirconium compounds are used in combination with the above-mentioned tetraalkoxysilanes, the weight ratio of the zirconium compounds to the tetraalkoxysilanes is preferably 1:0.5 to 1:5. If the ratio is less than 1:5, the ratio of the zirconium compounds is relatively small, so that hydrolysis does not proceed in a short period of time, resulting in inferior film formation. On the other hand, if the ratio exceeds 1:0.5, the ratio of the zirconium compounds is too high, causing deterioration of the storage stability of the resulting compositions, and hydrolysis occurs too rapidly, resulting in inferior film formation.

(b) At least one inorganic compound selected from the group consisting of zeolite, silica gel, aluminosilicate minerals and alumino-silica gel to which a silver salt or colloidal silver is added in an amount of 0.2 to 10% by weight in terms of silver by ion exchange, adsorption or adherence.

The silver-carrying inorganic compounds of ingredient (b) give the function of preventing polymerization and the function of subdividing molecules of hydrocarbons to the reforming catalysts used in the present invention, and this ingredient is indispensable.

Silver in ingredient (b) is carried in the ion state on carriers of the above-mentioned inorganic compounds, and the function of preventing polymerization and function of subdividing molecules are considered to be caused by its catalytic function. The above-mentioned catalysts have a very large surface area, and therefore exhibit the effect of preventing polymerization and the effect of subdividing molecules over a long period of time, even if used in small amounts.

For allowing such silver to be carried, silver salts or colloidal silver is used.

Examples of the silver salts include but are not limited to silver nitrate, silver sulfate and silver chloride. One or more of them are dissolved in water to use as mixed aqueous solutions. The silver salts also acts as acidic catalysts on hydrolysis of the above-mentioned organoalkoxysilanes constituting ingredient (a).

These mixed aqueous solutions of metal salts can be applied to the above-mentioned carrier of the inorganic compounds by adsorption or ion exchange.

Colloidal silver has an average particle size of 3 to 100 m$\mu$, preferably 5 to 20 m$\mu$, and more preferably about 5 m$\mu$, and can adhere to the surfaces of the above-mentioned inorganic compounds having a large surface area.

The content of silver in ingredient (b) used in the reforming catalysts employed in the present invention is preferably 0.2 to 10% by weight, and more preferably 1 to 8% by weight in terms of silver. If the amount of silver is less than 0.2% by weight, the ability of preventing polymerization and the ability of subdividing molecules desired in the present invention are too small. On the other hand, the amount of silver exceeding 10% by weight is too much to be adsorbed by the metals, or results in insufficient ion exchange capacity, which unfavorably causes elution of the metals in some cases.

As the inorganic compound of ingredient (b) for carrying silver, at least one inorganic compound selected from the group consisting of zeolite, silica gel, aluminosilicate minerals and alumino-silica gel is used.

Ingredient (b) used in the present invention can be obtained by allowing the aqueous solutions of the silver salts to come into contact with these carriers to conduct ion exchange or adsorption, or by allowing colloidal silver to come into contact with the carriers to adhere it.

The inorganic compound carriers are described by ingredients in detail below: (Zeolite)

Zeolite used in the present invention is natural or synthetic zeolite represented by the following general formula, and available in various kinds different in composition ratio, pore size, specific surface area, etc.

$$xM_{2/p}O \cdot Al_2O_3 \cdot ySiO_2 \cdot zH_2O$$

wherein M represents an ion-exchangeable metal ion, usually an univalent or bivalent metal; p represents the valence thereof; x represents the coefficient of a metal oxide; y represents the coefficient of silica; and z represents the number of water of crystallization.

For example, natural zeolite includes analcime, chabasite, clinoptilolite, erionite, forgeasite and mordenite. On the other hand, synthetic zeolite includes A-zeolite, X-zeolite, Y-zeolite and T-zeolite.

Zeolite is preferably in the granular form, and the particle size thereof is suitably 10 $\mu$m or less. It is preferred that zeolite has a particle size of 3 $\mu$m or less, a specific surface area of 150 m$^2$/g or more and a molar ratio of $SiO_2/Al_2O_3$ of 14 or less.

In the present invention, the above-mentioned synthetic zeolite having a greater specific surface area and excellent in adsorbing ability is preferably used.
(Silica gel)

The silica gel is a compound represented by general formula $SiO_2 \cdot nH_2O$, and comprises glassy transparent or semitransparent particles. The fine structure thereof shows a coarse texture. For example, the specific surface area is as high as 450 m$^2$/g or more.

In the present invention, it is preferred that the silica gel has an average particle size of 10 μm or less to form a thin film excellent in resistance to wear.

(Aluminosilicate minerals)

The aluminosilicate minerals are salts comprising aluminosilicic acid ions in which condensed silicic acid is partly substituted by aluminum and various metal ions, and include kaolinite, halloysite, muscovite, montmorillonite, vermiculite, feldspar and other natural minerals. They have a large surface area and also have ion exchange ability. The particle size of the aluminosilicate minerals is usually 0.1 to 10 μm, and preferably 0.5 to 3 μm.

(Alumino-silica gel)

The alumino-silica gel is an amorphous gel represented by general formula $Al_2O_3 \cdot mSiO_2 \cdot nH_2O + Al(OH)_3$ which has a large surface area and both the functions of silica and alumina. It may be formed by mixing with activated carbon. This is excellent in adsorption property. The particle size is 0.5 to 10 μm, and preferably 0.5 to 3 μm.

When (i) is used as ingredient (a), the amount of ingredient (b) in the coating composition used in the reforming catalyst employed in the present invention is usually 5 to 100 parts by weight based on 100 parts by weight of the organoalkoxysilane, and preferably 10 to 70 parts by weight. When (ii) is used as ingredient (a), the amount of ingredient (b) is preferably 5 to 100 parts by weight based on 100 parts by weight of (ii) in terms of the tetraalkoxysilane.

For the respective materials described above, if the amount of the silver-carrying inorganic compounds used is less than the specified amount, the effect of preventing polymerization and the effect of subdividing molecules are not fully obtained. On the other hand, exceeding the specified amount unfavorably results in increased viscosity of the compositions and elution.

(c) Alcohols;

The alcohols are agents for controlling the concentration of the above-mentioned ingredient (a), further for preventing the excessive gelation of the organoalkoxysilanes, the tetraalkoxysilanes or the zirconium compounds constituting the above-mentioned ingredient (a) when they are hydrolyzed with water, and for removing water by azeotropic distillation while controlling polycondensation reaction of the hydrolyzates.

As the alcohols, monohydric alcohols, ethylene glycol, which is a dihydric alcohol, or derivatives thereof can be used. Of these, lower aliphatic alcohols having 1 to 5 carbon atoms are preferred as the monohydric alcohols. Examples thereof include methanol, ethanol, n-propyl alcohol, i-propyl alcohol, sec-butyl alcohol and t-butyl alcohol. Ethylene glycol and the derivatives thereof include ethylene glycol, ethylene glycol monobutyl ether and ethylene glycol monoethyl ether acetate. Of these alcohols, i-propyl alcohol, sec-butyl alcohol and ethylene glycol monoethyl ether acetate are preferred.

These alcohols may be used alone or as a combination of two or more of them.

When (i) is used as ingredient (a), the amount of the alcohol in the coating composition used in the reforming catalyst employed in the present invention is usually 15 to 400 parts by weight based on 100 parts by weight of ingredient (a) in terms of (i), and preferably 40 to 200 parts by weight. When (ii) is used as ingredient (a), the amount of the alcohol is preferably 80 to 800 parts by weight based on 100 parts by weight of ingredient (a) in terms of (ii).

For the respective materials described above, if the amount of the alcohols used is less than the specified amount, the compositions are separated into two layers or gelation takes place. On the other hand, exceeding the specified amount results in relatively decreased amounts of other ingredients, which weakens the adhesion of the films of the resulting materials or causes the films to become too thin to obtain desired ones in some cases.

(d) Water

Water is an ingredient indispensable for hydrolysis of the organoalkoxysilanes, the tetraalkoxysilanes or the zirconium compounds constituting ingredient (a), and also serves as a viscosity controlling agent, a drying speed controlling agent, ingredients (a) and (b) and further a dispersion medium for fillers used if necessary.

The water which can be used herein is common service water, distilled water or ion exchange water. In particular, when the compositions are highly purified, distilled water or ion exchange water is preferred. The water is understood to include, for example, water produced by hydrolysis of the organoalkoxysilanes, the tetraalkoxysilanes or the zirconium compounds constituting ingredient (a).

When (i) is used as ingredient (a), the amount of the water in the coating composition used in the reforming catalyst employed in the present invention is usually 15 to 400 parts by weight based on 100 parts by weight of (i), and preferably 40 to 200 parts by weight. When (ii) is used, the amount of the water is 0 to 25 parts by weight based on 100 parts by weight of (ii), and preferably 0 to 15 parts by weight.

For the respective materials described above, if the amount of the water used is less than the specified amount, the hydrolysis of ingredient (a) does not sufficiently take place. On the other hand, exceeding the specified amount results in deteriorated stability of the compositions used in the present invention.

The coating compositions for preparing the coating films containing silver are obtained by mixing the above-mentioned ingredients (a) to (d). The pH thereof is preferably 2 to 6.5, and acids may be contained to adjust the pH.

(e) Fillers

Additionally, fillers may be added if necessary. The fillers are used to give the decorative property to the resulting coating films, to exhibit the effect of preventing polymerization due to the enlarged surface area of the coating films, to improve subdivision of the molecules of hydrocarbons, and to improve various characteristics such as corrosion resistance, durability and the strength of the coating films.

Such fillers include, for example, one or more of general non-water soluble pigments such as inorganic pigments, and granular or fibrous metal oxides, carbides and nitride other than the pigments. Specifically, they include but not limited to silica gel, synthetic zeolite, activated carbon, silicon dioxide, titanium oxide, aluminum oxide, chromium oxide, manganese oxide, iron oxide, zirconium oxide, cobalt oxide kaolin, synthetic mullite, zircon (zirconium silicate), silicon carbide and potassium titanate.

For enlargement of the surface area of the coating films, colloidal silica, alumina and titania, and ultrafine granular silica, alumina and titania can also be used. In addition, previously known additives such as chelating agents, surface active agents, silane coupling agents, titanium coupling agents and alkali metal salts can be used if necessary. The solid concentration of the coating compositions is usually 10 to 60% by weight, and preferably 15 to 45% by weight. If the concentration is less than 10% by weight, the thickness of the resulting coating films is too thin, leading to decreases in the effect of preventing polymerization and the effect of subdividing molecules or to a reduction in the strength of the coating films. On the other hand, exceeding 60% by weight unfavorably results in easy gelation, too much increased viscosity or deterioration of adhesion.

When the coating composition is prepared, the above-mentioned ingredients (a) to (d) or ingredients (a) to (e) are first mixed. In this case, ingredients (a) to (d) or ingredients (a) to (e) may be concurrently mixed, or ingredient (b) and ingredient (e) if necessary may be added to ingredient (a) and ingredient (c) (alcohol), followed by addition of ingredient (d) (water) at the time of use.

In ingredient (b), an aqueous solution of the silver salt and the inorganic compound carrier may be mixed with ingredients (a), (c) and (d), and further with ingredient (e), not allowing silver to be previously carried on the inorganic compound carrier.

In the present invention, the above-mentioned ingredients (a) to (d) or ingredients (a) to (e) are thus mixed, and then can be used. When (i) is used as ingredient (a), it is preferred to conduct ageing for 2 to 72 hours, more preferably for 3 to 24 hours after all ingredients have been mixed.

If the aging time is less than 2 hours, hydrolysis and the polycondensation reaction of ingredient (a) do not sufficiently proceed, the heat of reaction remains, and the cissing phenomenon is liable to take place when the composition is applied to the substrate. On the other hand, if the time exceeds 72 hours, polycondensation reaction of ingredient (a) proceeds in excess, causing deterioration of dispersion stability of the composition, decreases in density, adhesion and hardness of the resulting film, and loss of the gloss in some cases. It is preferred that the ageing is usually conducted at ordinary temperature of 10° to 30° C.

The coating composition used in the present invention can be dispersed with a high-speed stirrer, a ball mill or another dispersing device, and filtered, thereby forming an uniform stable dispersion.

Coating of the above-mentioned coating agents is conducted by applying the coating compositions prepared as described above to surfaces of the substrates through coating means such as dipping, kneading, spraying and brushing, followed by heating at 100° to 400° C. for 5 to 120 minutes, thereby easily curing the compositions to obtain coating films excellent in prevention of polymerization of hydrocarbons and in subdivision of molecules.

The amount of the above-mentioned coating agents based on the substrates is preferably 0.2 to 20% by weight (in terms of the amount of dried coating films), and more preferably 0.5 to 5% by weight.

The content of silver contained in the thus-obtained reforming catalysts used in the present invention is preferably 0.03 to 1.5% by weight, and more preferably 0.05 to 1.0% by weight. Less than 0.03% by weight lowers the effect of preventing polymerization of hydrocarbons and the effect of subdividing molecules, whereas exceeding 1.5% by weight unfavorably causes elution of silver or a reduction in adhesion.

The shape of the reforming catalysts thus obtained may be any, granular or tabular. In the case of the granular catalysts, the particle size is preferably 1 to 50 mm. A particle size of less than 1 mm results in easy destruction and difficult handling, e.g. packaging in a container. On the other hand, a particle size of more than 50 mm unfavorably results in a relatively small specific surface area and difficult handling.

Figure 1A:
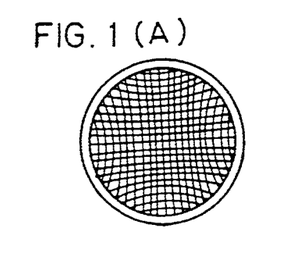
FIG. 1(A) is a plan view of one embodiment of a container for containing a granular reforming catalyst used in the present invention.
Figure 1B:
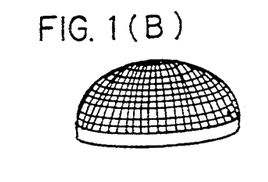
FIG. 1(B) is a perspective view thereof.
Figure 1C:
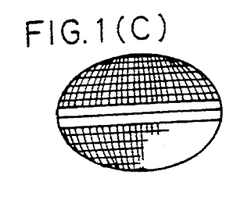
FIG. 1(C) is a side elevation view of another embodiment of a container.
Figure 1D:
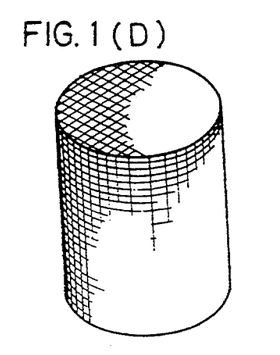
FIG. 1(D) is a perspective of a further embodiment of a container.
Figure 1E:
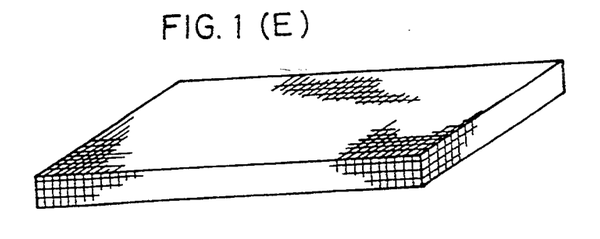
FIG. 1(E) is a perspective view of still another embodiment of a container.

The granular catalyst is desirably placed in a wire-mesh container as shown in FIGS. 1(A) to 1(E). FIG. 1(A) is a plan view of a spherical or semispherical wire-mesh container, FIG. 1(B) is a perspective view of the semispherical wire-mesh container, FIG. 1(C) is a side elevation view of the spherical wire-mesh container, FIG. 1(D) is a perspective of a cylindrical wire-mesh container, and FIG. 1(E) is a perspective view of a box-like wire-mesh container.

Figure 2A:
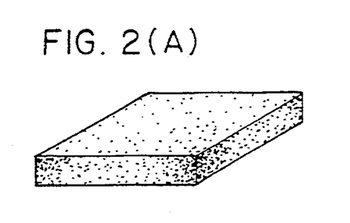
FIGS. 2(A), 2(B), 2(C), and 2(D) are perspective views of tabular reforming catalysts used in the present invention.
Figure 2B:
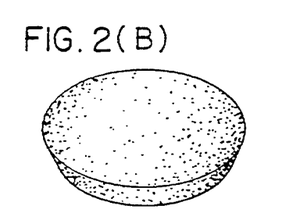
Figure 2C:
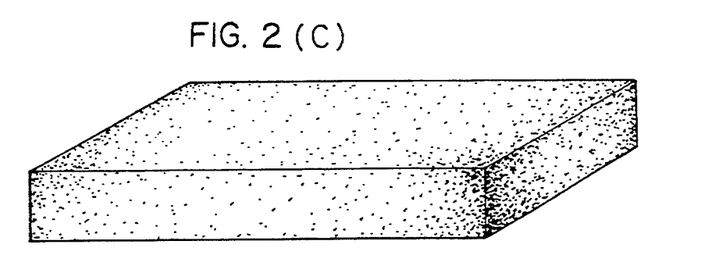
Figure 2D:
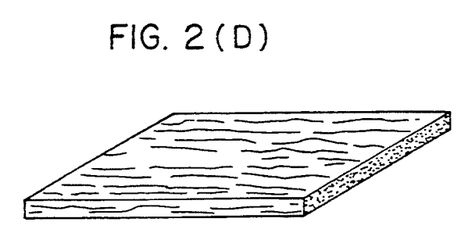

For the tabular catalysts, FIGS. 2(A) to 2(D) are perspective views of (A) square, (B) circular and (C) rectangular catalysts, respectively. However, the shape of the catalysts is not limited thereto, and may be any. The thickness thereof is preferably 3 to 50 mm. Further, FIG. 2(D) is a perspective view showing a catalyst having foamed aluminum as a substrate.

The reforming catalysts for hydrocarbons used in the present invention are added in an amount of 0.1 to 10% by weight to the hydrocarbons to give the effect of preventing polymerization, whereby fats and oils and petroleum products used at elevated temperatures can be prevented from deteriorating. For example, when edible oils are used in frying, no increase in viscosity, no change in color and no odor are observed at all, which shows the edible oils are not changed, maintaining the state of fresh oils 3 to 5 times longer than that of conventional edible oils. Addition of the reforming catalysts for hydrocarbons to fresh oils has been found to further lower the viscosity of the fresh oils. Namely, the reforming catalysts for hydrocarbons used in the present invention can keep the edible oils fresh, and also further lower the viscosity thereof.

The reforming catalysts used in the present invention are non-elutable solid catalysts excellent in heat resistance, and can be continuously used for a long period of time. Fats and oils and petroleum products can be substantially prevented from deteriorating by this catalytic effect, and fats and oils and lubricating oils used at elevated temperatures can be used by additional supply. The amount of waste oils can therefore be substantially decreased.

In burnable hydrocarbons such as gasoline, kerosine, oil fuel, jet fuel and crude oil, the molecules are usually coagulated. However, the coagulated molecules are subdivided by contact with the reforming catalysts used in the present invention, thereby improving atomization and combustion efficiency. Further, the reforming catalysts used in the present invention have the ability to decompose bacteria and odor components, as another effect. Namely, surfaces of cells of the bacteria are destroyed by oxidation to conduct sterilization, and the odor components are decomposed by oxidation. Furthermore, the detergent dispersing property of engine oil in automobiles and ships can also be substantially improved.

Specifically, the methods for reforming hydrocarbons of the present invention are carried out as follows. When the hydrocarbons are fuel oils such as gasoline and gas oil, the catalysts of the present invention are introduced through supply inlets for the fuel oils, and allowed to be contact with the fuel oils, preferably for 10 minutes or more, more preferably for 2 hours or more. In the case of lubricating oils having a high viscosity such as engine oil, the catalysts are allowed to be in contact with the oils, preferably for 4 hours or more. These fuel oils and lubricating oils may be treated by contact with the catalysts at temperatures at which the oils are used, namely at ordinary temperature. In the case of edible oils, the catalysts are always immersed in the oils, not only at elevated temperatures in frying, but also during storage of the edible oils.

The reforming catalyst for hydrocarbons used in the present invention comprises the carrier having a large surface area and the silver-containing coating film adhered thereon. For the function of this catalyst, it is considered that the liquid hydrocarbons are excited by contact reaction to eliminate radicals produced by oxidation reaction, thereby preventing formation of R—R (dimer) described later and further subdividing the coagulated molecules° This will be described in details below.

Oxidation polymerization reaction of hydrocarbons is considered to proceed as follows:

wherein RH represents a hydrocarbon molecule, and ROOH represents a hydroperoxide.

A conventional antioxidant reacts with the free radical ROO. in the above-mentioned formula (3) to inhibit progress of the reaction, whereas the reforming catalyst used in the present invention is considered to prevent formation of R—R (dimer) due to the reaction of R. with ROO. in the above-mentioned formulae (5) and (6). The reason for this is that the silver-containing reforming catalyst used in the present invention is excited by contact with the hydrocarbon, resulting in elimination of the R. and ROO. radicals to prevent polymerization. Namely, the reforming catalysts used in the present invention do not inhibit formation of oxides and peroxides, but inhibit formation of polymers to prevent an increase in kinematic viscosity of hydrocarbons. This is particularly effective for oils used under conditions under which thermal polymerization rapidly proceeds, such as edible oils and engine oil.

In hydrocarbons such as gasoline, kerosine, oil fuel, jet fuel and crude oil, the molecules are usually coagulated. However, the coagulated molecules can be subdivided by contact with the reforming catalysts used in the present invention to improve atomization and combustion efficiency, resulting in the extremely decreased amount of hydrocarbons contained in exhaust gases.

Further, in order to allow the function of silver ions to be maximally exhibited, the coating compositions used in the present invention comprise the carriers having an extensive specific surface area such as zeolite, silica gel, aluminosilicate minerals and alumino-silica gel, and hydrolysis type silane compounds (such as organoalkoxysilanes), or tetraalkoxysilanes and zirconium compounds as the binders, thus forming the coating films having a large surface area in such a manner as the ultrafine particles are spread all over the substrates. Furthermore, the compositions are applied to the porous substrates, so that the catalytic function can be very effectively exhibited.

The reforming catalysts used in the present invention can inhibit formation of polymers of hydrocarbons under conditions under which thermal polymerization rapidly proceeds to prevent an increase in kinematic viscosity of the hydrocarbons, particularly in the case of oils such as edible oils and engine oil. For example, deterioration of an edible oil due to frying can be prevented, which results in prevention of an increase in viscosity. Accordingly, the heat conduction to a material is not inhibited, and fried food is little impregnated with the oil, even if the oil is used repeatedly. Thus, the flavorous crisp fried food can be obtained, and the life of the edible oil can be substantially prolonged.

The reforming catalysts used in the present invention are non-elutable solid catalysts excellent in heat resistance, and can be continuously used for a long period of time. Fats and oils and petroleum products can be substantially prevented from deteriorating by this catalytic effect, and fats and oils and lubricating oils used at elevated temperatures can be used by additional supply. The amount of waste oils can therefore be substantially decreased. In burnable hydrocarbons such as gasoline, kerosine, oil fuel, jet fuel and crude oil, the molecules are subdivided, thereby improving atomization and combustion efficiency. Further, the reforming catalysts used in the present invention have the ability to decompose bacteria and odor components, as another effect. Namely, cells of the bacteria are destroyed by ionized oxygen to conduct sterilization, and the odor components are decomposed by oxidation. Furthermore, the detergent-dispersing property of engine oil in automobiles and ships can also be substantially improved.

The present invention will be described in more details referring to examples, but is not limited thereto without departing from the scope of the claims.

All parts and percentages are by weight, unless otherwise specified.

Reference Example (Preparation of Reforming Catalysts)

For the purpose of examining the polymerization preventing property, the detergent-dispersing property and the non-elutability of fats and oils, reforming catalysts were prepared in the following manner.

First, eight kinds of coating compositions A to H shown in Table 1 were prepared.

To 400 parts of methyltrimethoxysilane (a) placed in a preparation vessel, 229 parts of isopropanol (c) and 120 parts of silver-carrying synthetic zeolite (1) (b) were added. After gentle stirring, the mixture was passed though a 200-mesh filter, and 250 parts of ion exchange water (c) and 1 part of acetic acid were added thereto, followed by stirring at 2,000 rpm for 15 minutes. The resulting mixed solution was aged for 3 hours to prepare composition A.

Compositions B, C and E to H were prepared similarly.

Composition D was prepared by placing 160 parts of tetraethoxysilane (a) and 140 parts of tetrabutoxyzirconium (a) in a preparation vessel, adding 390 parts of isopropanol (c), 100 parts of silver-carrying kaolin (b), 100 parts of silver-carrying silica gel (b) and 110 parts of a black pigment, and mixing them in a ball mill for about 6 hours after gentle stirring.

TABLE 1

| Component (part) | Composition | | | | | | | |
|---|---|---|---|---|---|---|---|---|
| | A | B | C | D | E | F | G | H |
| (a) Methyltrimethoxysilane | 400 | — | 250 | — | 550 | 200 | 300 | 220 |
| (a) Methyltriethoxysilane | — | 350 | — | — | — | 100 | — | — |
| (a) Tetraethoxysilane | — | — | — | 160 | — | — | — | — |
| (a) Tetrabutoxyzirconium | — | — | — | 140 | — | — | — | — |
| (b) Silver-carrying synthetic zeolite (1) | 120 | — | — | — | 270 | 50 | — | — |
| (b) Silver-carrying synthetic zeolite (2) | — | 30 | — | — | — | — | — | — |
| (b) Silver-carrying kaolin | — | — | — | 100 | — | 50 | — | — |
| (b) Silver-carrying alumino-silica gel | — | — | 80 | — | — | — | — | — |
| (b) Silver nitrate | — | — | — | — | — | — | — | 10 |
| Synthetic zeolite | — | — | — | — | — | — | — | 100 |
| (c) Isopropanol | 229 | 320 | 170 | 390 | — | 290 | 280 | — |
| (c) Ethanol | — | — | 100 | — | 48 | — | — | 320 |
| (c) Water | 250 | — | 400 | — | 130 | 250 | 300 | 350 |
| Acetic acid | 1 | — | — | — | 2 | 10 | — | — |
| Colloidal alumina (pH 2.5) | — | 300 | — | — | — | — | — | — |
| Black pigment (iron oxide.manganese) | — | — | — | 110 | — | — | 110 | — |

Note: The silver content is 8% for silver-carrying synthetic zeolite (1), 5% for silver-carrying synthetic zeolite (2), 0.5% for silver-carrying kaolin, 0.3% for silver-carrying silica gel, 1% for silver-carrying alumino-silica gel (colloidal silver), and 65% for silver nitrate.

Then, the substrates shown in Table 2 were coated with the coating compositions shown in Table 1 to prepare reforming catalysts 1P to 9P. The substrates were obtained by baking the materials shown in Table 2 at 1,100 to 1,600° C., except for foamed aluminum.

Figure 3A:
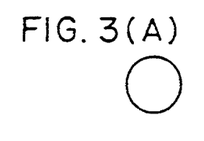
FIGS. 3(A) and 3(B) are schematic views showing the shape of substrates shown in Table 2.
Figure 3B:
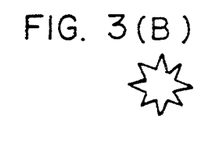

After coating, compositions A to H are all cured by heating at 280° C. for 30 minutes. The particle shape of the substrates is shown in FIG. 3.

TABLE 2

| Starting Material of Substrate | Shape | Size (mm) | Coating Agent | Silver Content of Catalyst (%) | Name of Catalyst |
|---|---|---|---|---|---|
| Natural zeolite | Granular; FIG. 3(A) | 7 in diam. | A | 0.80 | 1P |
| Natural zeolite | Granular; FIG. 3(B) | 4 in diam. | H | 0.52 | 2P |
| Sepiolite | Granular; FIG. 3(A) | 3 in diam. | B | 0.08 | 3P |
| Kaolin.feldspar | Granular; FIG. 3(A) | 5 in diam. | E | 1.30 | 4P |
| Kaolin.feldspar | Tabular; (square) | 50 × 50 | D | 0.17 | 5P |
| Vermiculite.silica sand | Granular; FIG. 3(A) | 2 in diam. | G | 0.008 | 6P |
| Aluminum hydroxide.iron oxide | Tabular; (rectangular) | 100 × 50 | C | 0.42 | 7P |
| Silica.alumina fiber.feldspar | Tabular; (circular) | 100 in diam. | F | 0.33 | 8P |
| Foamed aluminum | Tabular; (rectangular) | 100 × 40 | A | 0.12 | 9P |
| Stainless steel (SUS304) | Tabular; (square) | 75 × 75 | E | 0.74 | 10P |

Note) Sepiolite: $Mg_4(H_2O)_2(OH)_2(Si_{16}O_{15})$; All plates have a thickness of 10 mm.

EXAMPLE 1

In order to examine the effect of preventing polymerization of fats and oils according to the reforming catalysts used in the present invention, the fats and oils were heated to proceed thermal polymerization, and their kinematic viscosity was measured. The iodine value and the peroxide value were also measured. The measurement was carried out according to "the standard analytical testing methods for fats and oils" edited by Nippon Yukagaku Kyokai (the Oil Chemical Society of Japan). Results are shown in Table 3.

The iodine value is a value proportional to the total number of double bonds contained in unsaturated fatty acids, and shows changes in the course of progress of polymerization. Table 3 indicates that the peroxide value is little affected by the use of the catalysts, and rather increases in some cases.

TABLE 3

| Fats and Oil | | Catalyst | | Heating Conditions (°C./hr) | Kinematic Viscosity (cst) | Iodine Value | Peroxide Value (meq/kg) |
|---|---|---|---|---|---|---|---|
| Kind | Amount (liter) | Name | Amount (g) | | | | |
| Rapeseed oil | 0.6 | — | — | 230/4 | 315 | — | 1.57 |
| Rapeseed oil | 0.6 | 1P | 15 | 230/4 | 106 | — | 2.13 |
| Rapeseed oil | 0.2 | — | — | Ordinary temp. | 73 | 115.4 | — |
| Rapeseed oil | 0.2 | — | — | 180/16 | 178 | 91.5 | — |
| Rapeseed oil | 0.2 | 2P | 5 | 180/16 | 84 | 111.7 | — |

TABLE 3-continued

| Fats and Oil | | Catalyst | | Heating | Kinematic | | Peroxide |
|---|---|---|---|---|---|---|---|
| Kind | Amount (liter) | Name | Amount (g) | Conditions (°C./hr) | Viscosity (cst) | Iodine Value | Value (meq/kg) |
| Rapeseed oil | 0.2 | 3P | 5 | 180/16 | 92 | 107.1 | — |
| Rapeseed oil | 0.2 | 4P | 5 | 180/16 | 78 | 112.4 | — |
| Rapeseed oil | 0.2 | 6P | 5 | 180/16 | 169 | 90.8 | — |
| Rapeseed oil | 0.2 | 9P | 1 plate | 180/16 | 88 | 107.5 | — |
| Soybean oil | 1.0 | — | — | 200/16 | 205 | 117.4 | 1.34 |
| Soybean oil | 1.0 | 1P | 20 | 200/16 | 87 | 125.9 | 1.10 |
| Soybean oil | 1.0 | 5P | 1 plate | 200/16 | 77 | 125.5 | 1.13 |
| Soybean oil | 1.0 | 7P | 1 plate | 200/16 | 92 | 126.8 | 1.31 |
| Soybean oil | 1.0 | 8P | 1 plate | 200/16 | 85 | 125.9 | 1.27 |
| Rice oil | 0.5 | — | — | Ordinary temp. | 68 | — | — |
| Rice oil | 0.5 | — | — | 230/4 | 288 | — | — |
| Rice oil | 0.5 | 10P | 10 | 230/4 | 92 | — | — |
| Sunflower oil | 0.5 | — | — | 190/8 | 161 | — | — |
| Sunflower oil | 0.5 | 7P | 1 plate | 190/8 | 73 | — | — |

EXAMPLE 2

In order to examine states in which formation of polymers is prevented by the reforming catalysts used in the present invention, constituent fatty acids of soybean oil were analytically measured with time by gas chromatography. Results are shown in Table 4.

TABLE 4

| Heating Temp. (°C.) | Heating Time (hr) | Catalyst | | Constituent Fatty Acids of Soybean Oil (%) | | | | | |
|---|---|---|---|---|---|---|---|---|---|
| | | Name | Amount | Palmitic Acid | Stearic Acid | Oleic Acid | Linoleic Acid | Linolenic Acid | Polymer |
| Fresh oil | — | — | — | 10.5 | 4.6 | 24.3 | 52.8 | 7.8 | 0 |
| 180 | 16 | — | — | 10.0 | 3.2 | 22.0 | 45.7 | 6.1 | 13.0 |
| | 16 | 1P | 15 g | 10.5 | 4.3 | 23.6 | 52.6 | 7.8 | 1.2 |
| | 24 | — | — | 9.1 | 2.3 | 18.4 | 40.1 | 5.6 | 24.5 |
| | 24 | 7P | 1 plate | 10.3 | 4.1 | 23.1 | 50.9 | 7.4 | 4.2 |
| 200 | 16 | — | — | 9.3 | 2.2 | 18.2 | 38.8 | 5.7 | 25.8 |
| | 16 | 1P | 15 g | 10.3 | 4.3 | 22.8 | 49.5 | 7.6 | 5.5 |

EXAMPLE 3

In order to examine changes in viscosity and the detergent-dispersing property of a lubricating oil after oxidation, the oxidation stability test of engine lubricating oil was conducted in accordance with JIS K2514 using the reforming catalysts used in the present invention. Test results after 24 hours and 36 hours are shown in Table 5.

EXAMPLE 4

In order to examine the elutability of silver contained in the reforming catalysts used in the present invention, each of the reforming catalysts is added in a specified amount to 1 liter of each edible oil or engine oil, and immersed therein at 180° C. for 3 hours to conduct the elutability test. The analysis was carried out by atomic absorption spectrophotometry. Results are shown in Table 6.

TABLE 6

| Fats and Oils | Catalyst | | Result |
|---|---|---|---|
| | Name | Amount | |
| Rapeseed oil | 2P | 50 g | Silver: 0.01 μg or less |
| Soybean oil | 4P | 50 g | Silver: 0.01 μg or less |
| Engine oil | 8P | 1 plate | Silver: 0.01 μg or less |

TABLE 5

| | | 1 No catalyst | | 2 1P (5%) | | 3 3P (5%) | | 4 4P (3%) | | 5 5P (1 plate) | |
|---|---|---|---|---|---|---|---|---|---|---|---|
| After 24 hr | Kinematic viscosity cst (mm²/S) | | | | | | | | | | |
| | 40° C. | 31.80 | 33.49 | 31.73 | 31.67 | 32.25 | 31.86 | 30.73 | 30.88 | 30.18 | 30.51 |
| | Viscosity Ratio | 1.09 | 1.15 | 1.09 | 1.09 | 1.11 | 1.09 | 1.05 | 1.06 | 1.03 | 1.05 |
| | Lacquer Degree | Deposit thick | thick | Deposit thin | thin | Deposit medium | thin | Deposit thin | thin | Deposit none | thin |

| | | 1' No catalyst | | 2' 1P (5%) | | 3' 3P (5%) | | 4' 4P (3%) | | 5' 5P (1 plate) | |
|---|---|---|---|---|---|---|---|---|---|---|---|
| After 24 hr | Kinematic viscosity cst (mm²/S) | | | | | | | | | | |
| | 40° C. | 43.34 | 46.59 | 33.31 | 33.82 | 36.47 | 33.96 | 33.08 | 32.77 | 32.59 | 32.45 |
| | Viscosity Ratio | 1.49 | 1.60 | 1.14 | 1.16 | 1.25 | 1.16 | 1.13 | 1.12 | 1.12 | 1.11 |
| | Lacquer Degree | Deposit thick | thick | Deposit thin | thin | Deposit medium | medium | Deposit thin | thin | Deposit thin | thin |

Note) The fresh oil has a kinematic viscosity of 29.05 cst at 40° C.

(Test of Property of Preventing Deterioration of Fats and Oils)

For the respective cases that 50 g/liter of reforming catalyst 2P prepared above was added to rapeseed oil, and that not added, the peroxide value, the saponification value and the kinematic viscosity were measured by the standard analytical testing methods for fats and oils after keeping at 200° C. for 4 hours. Results are shown in Table 7.

TABLE 7

|  | Peroxide Value (POV) (meq/kg) | Saponification Value (SV) (KOH mg/g) | Kinematic Viscosity (cst) |
|---|---|---|---|
| Not added | 1.57 | 198.4 | 315 |
| Added | 2.13 | 195.4 | 106 |

(Test of Elutability in Edible Oil)

Reforming catalyst 4P prepared above was added in an amount of 15 g to 1 liter of the edible oil, and immersed therein at 180° C. for 30 minutes to conduct the elutability test. Results are shown in Table 8.

TABLE 8

|  | Result | Detection Limit (μg/ml) | Analytical Method |
|---|---|---|---|
| Arsenic (as $As_2O_3$) | Not detected | 0.1 | DDTC/Ag absorption spectro photometry |
| Lead | Not detected | 0.05 | Atomic absorption spectro photometry |
| Cadmium | Not detected | 0.01 | Atomic absorption spectro photometry |
| Silver | Not detected | 0.05 | Atomic absorption spectro photometry |

EXAMPLE 6

In order to examine the effect of the reforming catalyst used in the present invention with respect to a gasoline-fueled automobile, the exhaust gas test was conducted in the idling state before and after introduction of the catalyst into a fuel tank.

The test was conducted before introduction and after introduction in this order. Reforming catalyst 4P prepared in Reference Example was used as the reforming catalyst, and the test after introduction was initiated after an elapse of about 24 hours after introduction. The amount of the catalyst introduced was 100 g.

Particulars of the test automobile are as follows:
Type and purpose; a small-sized passenger car
The number of cycles and cylinders; four cycles and six cylinders
Total displacement; 1,988 cc
Maximum output; 130/5,400 (ps/rpm)
Normal idling speed; 700 rpm
Kind of fuel; lead-free gasoline
Transmission; automatic (forward 4 stages)
Weight of vehicle; 1,290 kg
Kind of exhaust gas measure; a three-dimensional catalyst + an $O_2$ sensor For analysis, an exhaust gas analyzing device (type MEXA-9400/CVS-9100, manufactured by Horiba, Ltd.) was used. Results are shown in Table 9. This reveals that addition of the reforming catalyst used in the present invention to gasoline results in an extremely reduced amount of hydrocarbons contained in the exhaust gas, which shows combustibility.

TABLE 9

|  | Before Introduction | | After Introduction | |
|---|---|---|---|---|
| Total Running Distance before Test (km) | 26,534 | | 26,571 | |
| Laboratory | | | | |
| Atmospheric Pressure (mm Hg) | 756.5 | | 761.0 | |
| Room Temperature | | | | |
| Dry Bulb (°C.) | 23.4 | | 25.0 | |
| Wet Bulb (°C.) | 16.4 | | 18.6 | |
| Relative Humidity (%) | 49 | | 54 | |
| Exhaust Gas | | | | |
| Gear Position | N | D | N | D |
| Engine Speed (rpm) | 698 | 629 | 708 | 629 |
| Intake Pressure (mm Hg) | 511 | 475 | 514 | 472 |
| Measured Values of Exhaust Gas Components (NDIR) | | | | |
| CO (%) | 0.01 | 0.00 | 0.01 | 0.00 |
| HC (ppm) | 22.5 | 28.2 | 2.16 | 2.14 |
| $CO_2$ (%) | 14.7 | 14.6 | 14.7 | 14.5 |

I claim:

1. A method for reforming a hydrocarbon which comprises allowing the hydrocarbon to come into contact with a reforming catalyst in which a surface of an inorganic substrate and/or a metallic substrate is treated with a silver-containing coating agent which is mainly composed of a composition obtained by mixing
    (a) (i) an organoalkoxysilane represented by general formula $R^1Si(OR^2)_3$, wherein $R^1$ represents an organic group having 1 to 8 carbon atoms, and $R^2$ represents an alkyl group having 1 to 5 carbon atoms or an acyl group having 1 to 4 carbon atoms; and (ii) at least one compound selected from the group consisting of a tetraalkoxysilane represented by formula $Si(OR^2)_4$, wherein $R^2$ has the same meaning as given above; and a zirconium compound represented by formula $Zr(OR')_4$ wherein R', which may be the same or different, represents a hydrocarbon residue having 2 to 5 carbon atoms;
    (b) at least one inorganic compound selected from the group consisting of zeolite, silica gel, aluminosilicate minerals and alumino-silica gel to which a silver salt or colloidal silver is added in an amount of 0.2 to 10% by weight in terms of silver by ion exchange, adsorption or adherence;
    (c) an alcohol; and
    (d) water.

2. The method according to claim 1, in which the hydrocarbon is a fuel oil, a lubricating oil or an edible oil.

3. The method according to claim 1, in which the inorganic substrate is a porous shaped product obtained by baking at least one compound selected from the group consisting of fine granular aluminosilicate minerals and/or silicate minerals, fine granular metal oxides, fine granular metal hydroxides and fibrous metal oxides.

4. The method according to claim 1, in which the metallic substrate is a foamed metal, or a metal at least a surface of which is treated to a porous form or roughened, or a mixture thereof.

5. The method according to claim 1, in which the reforming catalyst contains 0.03 to 1.5% by weight of silver, based upon the total catalyst.

6. The method according to claim 1, in which the reforming catalyst is used in an amount of 0.1 to 10% by weight, based on the hydrocarbon.

* * * * *